United States Patent
Schroeder

(10) Patent No.: US 9,792,563 B1
(45) Date of Patent: Oct. 17, 2017

(54) HUMAN RESOURCES SYSTEM DEVELOPMENT

(75) Inventor: Ralf Schroeder, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 982 days.

(21) Appl. No.: 11/728,262

(22) Filed: Mar. 22, 2007

(51) Int. Cl.
G06Q 10/00 (2012.01)
G06Q 10/10 (2012.01)

(52) U.S. Cl.
CPC .......... *G06Q 10/00* (2013.01); *G06Q 10/105* (2013.01)

(58) Field of Classification Search
CPC .................................................. G06Q 10/105
USPC ............................................ 705/1, 1.1, 320
See application file for complete search history.

(56) References Cited

U.S. PATENT DOCUMENTS

| | | | |
|---|---|---|---|
| 5,404,525 A * | 4/1995 | Endicott et al. ............. 717/108 |
| 6,067,548 A * | 5/2000 | Cheng ....................... 707/103 R |
| 6,085,217 A | 7/2000 | Ault | |
| 6,163,878 A * | 12/2000 | Kohl ............................. 717/100 |
| 6,405,202 B1 | 6/2002 | Britton et al. | |
| 6,591,295 B1 | 7/2003 | Diamond et al. | |
| 6,603,489 B1 | 8/2003 | Edlund et al. | |
| 7,020,659 B2 * | 3/2006 | Yorke | |
| 7,225,425 B2 | 5/2007 | Kompalli et al. | |
| 7,433,887 B2 * | 10/2008 | Thakkar et al. ......... 707/103 R |
| 7,487,187 B2 * | 2/2009 | Zhuang ............. G06F 17/30348 |
| 7,752,596 B2 * | 7/2010 | Wyganowski ............ G06F 8/36 717/100 |
| 2002/0062419 A1 | 5/2002 | Konson et al. | |
| 2002/0069081 A1 * | 6/2002 | Ingram et al. .................... 705/1 |
| 2002/0178264 A1 | 11/2002 | Benda et al. | |
| 2003/0177052 A1 | 9/2003 | Smith et al. | |
| 2003/0229529 A1 | 12/2003 | Mui et al. | |
| 2004/0119743 A1 | 6/2004 | Xu | |
| 2004/0181544 A1 * | 9/2004 | Anderson ..................... 707/102 |
| 2004/0230914 A1 | 11/2004 | Arend et al. | |
| 2005/0015277 A1 | 1/2005 | Mau | |
| 2005/0050071 A1 * | 3/2005 | Debrunner ................... 707/100 |
| 2005/0223360 A1 * | 10/2005 | Seeman et al. .............. 717/124 |
| 2005/0288987 A1 | 12/2005 | Satler et al. | |
| 2006/0271568 A1 * | 11/2006 | Balkir et al. ................. 707/100 |
| 2007/0011192 A1 * | 1/2007 | Barton ...................... 707/103 R |
| 2007/0140142 A1 | 6/2007 | Shaw | |
| 2007/0168971 A1 * | 7/2007 | Royzen ............... G06F 11/3688 717/124 |
| 2007/0185722 A1 | 8/2007 | Clarke | |

OTHER PUBLICATIONS

Wise, (Object-orientation and C++), 1995 http://www.acm.org/crossroads/xrdsl-3/ovp.html.*

* cited by examiner

*Primary Examiner* — Sangeeta Bahl

(74) *Attorney, Agent, or Firm* — Van Pelt, Yi & James LLP

(57) ABSTRACT

Defining a human resource system is disclosed. Metadata models are defined. Processes are defined. The human resources system is stored including metadata models and processes, wherein the stored metadata models and processes are interpreted using an interpretive engine, wherein the interpretive engine is configured to process the metadata model and process definitions without compilation of any code, and wherein defining metadata models and defining processes when interpreted by the interpretive engine is sufficient to define a fully functional human resource system.

17 Claims, 10 Drawing Sheets

HUMAN RESOURCES SYSTEM DEVELOPMENT

BACKGROUND OF THE INVENTION

Human capital management (HCM) systems or human resource (HR) systems help organizations manage human resources. This management can include payroll management, time and labor management, benefit administration management, personnel records management, review management, etc. Typically, HR systems are implemented as a computer program, which is compiled and run, that interacts with a stored set of records in a database. However, because the computer program is compiled, it requires considerable effort to change or update functionality; for example, having a supplier update the computer program code and release a new version of the HR system to be installed at the site of the organization. Also, the change or update to functionality may require a change to the record format of the database, which requires an updating of all the stored records of the database. It would be better if changes or updates could be easier to implement.

BRIEF DESCRIPTION OF THE DRAWINGS

Various embodiments of the invention are disclosed in the following detailed description and the accompanying drawings.

DETAILED DESCRIPTION

Figure 1:
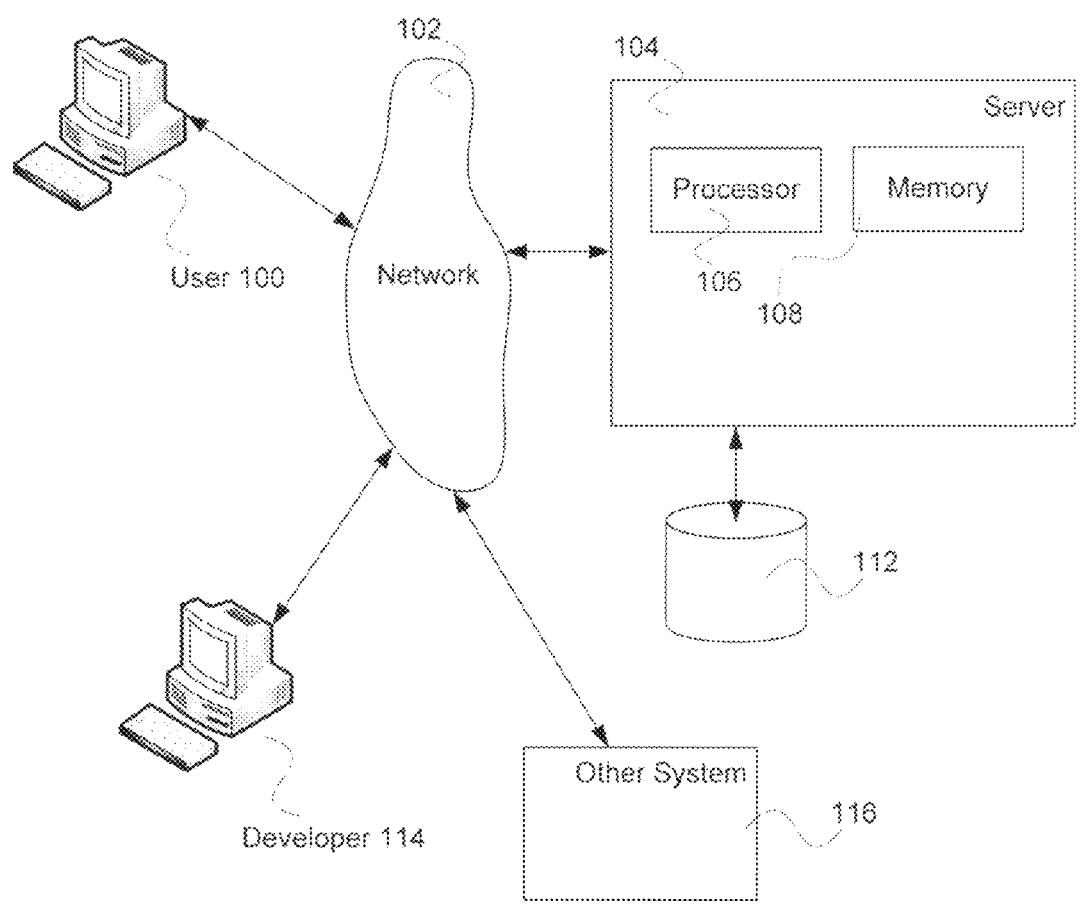
FIG. 1 is a block diagram illustrating an embodiment of a human resources system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A human resources system is disclosed. The human resources system includes definitions that are interpreted using an interpretive engine such as an interpretive java engine. The definitions include metadata models that include classes, attributes, methods, and relationships. The definitions include processes that include an element to respond to, a step to execute (that can include one or more methods) after the element arrives, and possibly an output. The interpretive engine is configured to process the metadata model and process definitions without any compilation of code. The definitions of the metadata models and the processes are sufficient to define a fully functional human resource system when interpreted by the interpretive engine. A fully functional human resource system captures and manages all data around workers, organizations, positions, and other human resources objects. Testing of the human resources system is achieved by executing the system by interpreting the metadata models and processes using the interpretive engine. The metadata models and processes are stored using tables—for example, an instance table, an attribute table, and a reference table (i.e., a table of relationship instances). This is in contrast to typical human resources systems that have hundreds to thousands of tables (e.g., a person table, a table for each person, etc.). When executing, the metadata models and processes as well as the instances and their associated data are loaded into memory.

Because of an interpretive execution of definitions, the human resources system is easy to modify. Changes to definitions can be immediately tested by executing using an interpretive engine. In addition, metadata models, processes, and data are stored using simple data structures in tables. For a given change in the human resources system, only that change is stored; no further changes are required to stored data elements. In contrast, database systems require changing each data row of the database if a given change requires an additional column for the database.

Transactional processing for a human resources system is disclosed. Transactional processing ensures that data and/or metadata are left in a consistent state. For example, an employee's contact information is being changed, but while processing the change the street name is changed but the street number has not yet been changed when an error occurs. Since the contact information change is processed as a transaction, all the changes for contact information are not transferred to permanent storage until all the changes have been completed, so in this case the old contact information remains and no changes are entered. If the transaction was processed in pieces, then the incorrect street name would have been entered and be present in the human resource system along with the previous address street number. Similarly, troublesome inconsistencies can be introduced for back dated salary increases or other transactions that require changing multiple data and metadata entries without transactional processing of the indivisible units of work.

A transaction is an indivisible unit of work that is to be processed by the human resource system as requested by a requestor. A transaction can modify, add, or delete information associated with a metadata model. A transaction request is received. The transaction request is queued. The request is validated. Validation includes security validation (ensuring that the requestor has the privileges to perform the requested transaction), schema validation (ensuring that the submitted request correspond to the metadata definition of the request in the system—for example, as to how the incoming XML is supposed to look: expecting "first name" and "last name," but instead received no "first name" and included "birth date"), and data validation (ensuring that the data in the requested transaction is of the correct type and in the correct range of values). One or more controlling objects are located or created. A controlling object is created, for example, if the object is a creation object or element and/or if the controlling object is not located. Using an interpretive engine, where the interpretive engine is configured to process definitions of the controlling object without compilation of any code, the controlling object indicates updates that are to be performed and linked objects with related updates to be performed. In some cases, related transactions are spawned to be queued and later processed. Once all updates and related updates to data and metadata are processed, a response is built. The transaction is committed. Upon commitment of the transaction the updates and related updates to data and metadata are transferred from temporary storage to permanent storage. In various embodiments, temporary storage comprises in-memory storage and/or comprises storage whose state can be recreated using permanent storage. In various embodiments, permanent storage comprises storage that is in a consistent state, comprises storage that is non-volatile, comprises encrypted storage and/or compressed storage, and/or comprises one or more magnetic hard drive storage units. Note that the transaction is either processed completely or not at all. The response is sent to the requestor.

FIG. 1 is a block diagram illustrating an embodiment of a human resources system. In the example shown, server 104 includes processor 106, and memory 108. Server 104 is coupled to external storage 112 so that server 104 is able to store information to and access information from external storage 112. Server 104 is also coupled to network 102. In various embodiments, network 102 comprises one or more of the following: a local area network, a wide area network, a wired network, a wireless network, the Internet, or any other appropriate network. Network 102 enables user 100, developer 114, and other system 116 to access server 104. In some embodiments, developer 114 defines a human resources system that runs on server 104. In various embodiments, other system 116 comprises a benefit system, a payroll system, a recruiting system, or any other appropriate system interacting with a human resource system.

In some embodiments, the application dynamically derives permissions using one or more rules by deriving the permissions in real-time from database data associated with user 100. In various embodiments, server 104 is implemented using multiple physical pieces of hardware including multiple processors for processor 106 and multiple memories for memory 108. In various embodiments, server 104 includes one or more devices for internal storage instead of or in addition to one or more external storage devices (e.g., external storage 112) for storing data associated with the human resources system. In some embodiments, the entire human resource system is located in memory when executing.

Figure 2:
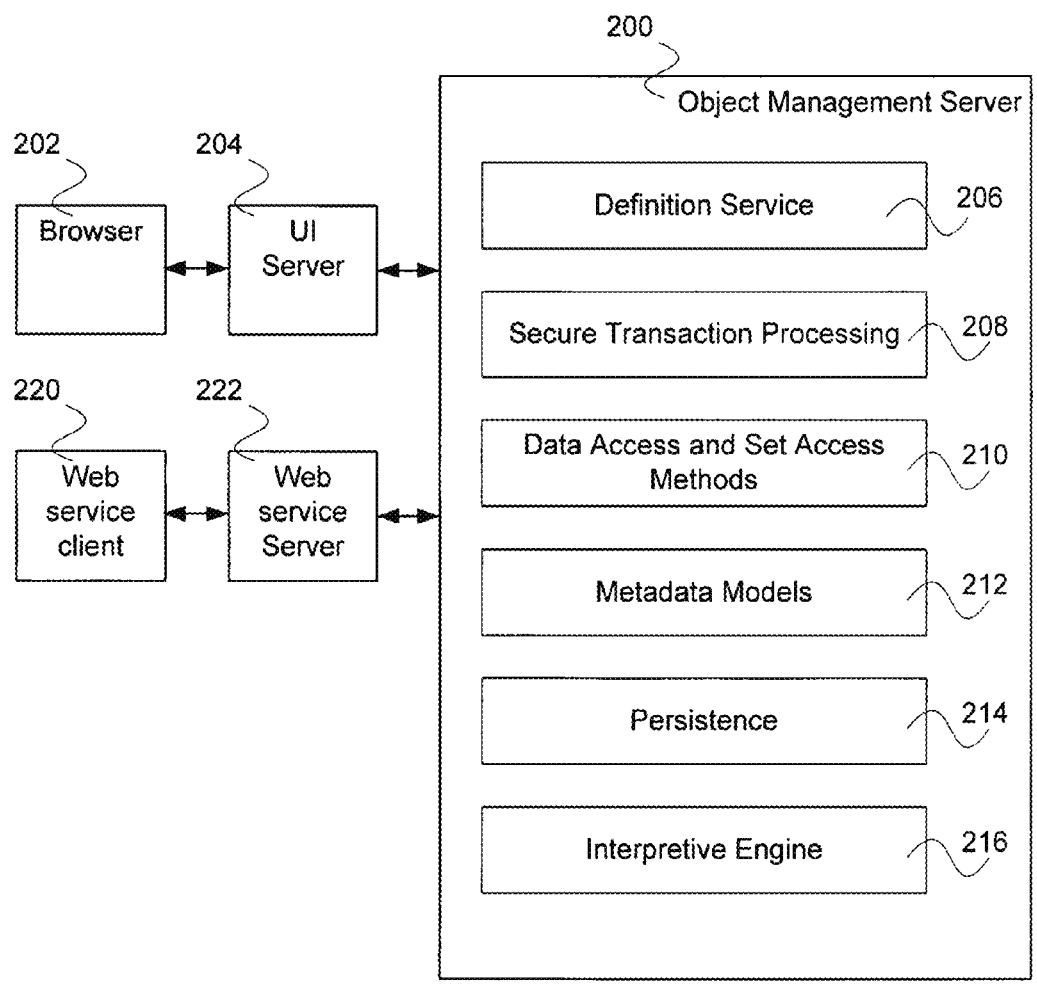
FIG. 2 is a block diagram illustrating an embodiment of software for a system for human resources.

FIG. 2 is a block diagram illustrating an embodiment of software for a system for human resources. In some embodiments, the software of FIG. 2 is executed on the system of FIG. 1. In the example shown, browser 202 interacts with user interface (UI) server 204. UI server 204 renders a user pleasing interface for a human user to the system (e.g., object management server). Web service client 220 interacts with web service (WS) server 222. WS server 222 interfaces other systems to the system (e.g., object management server). For example, a recruiting system can send recruit information over to WS server 222, payroll system can be interfaced with the system using WS server 222, or a benefit provider system can be interfaced using WS server 222. WS server 222 is designed to communicate using web services descriptive language (WSDL). In some embodiments, browser 202 is executing on a user computer such as user 100 of FIG. 1 that interacts with a user interface server such as server 104 of FIG. 1. UI server 204 interacts with object management server 200. In various embodiments, UI server 204 and object management server 200 are implemented using a single server—for example server 104 of FIG. 1—or using multiple servers (not shown in FIG. 1). Object management server includes definition service 206, secure transaction processing 208, data access and set access methods 210, metadata models 212, persistence 214, and interpretive engine 216. In various embodiments, user interacting with browser 202 is developing and/or executing the human resources system that is hosted by object management server 200.

Definition service 206 is used to define the human resources system. Definitions include definitions of metadata models and definitions of processing. Definition service 206 can test new definitions and changes to definitions by executing definitions using interpretive engine 216.

Secure transactional processing 208 is used to process transactions requested by a user. Transactions as units of work are queued, processed, and committed. The processing of a unit of work includes validation, locating a controlling object, performing updates and related updates, and building a response.

Data access and set access methods 210 is used to access, combine, select, filter instances and sets of instances (e.g., instances with relationships and/or work sets) as well as set and retrieve attribute(s) of an instance.

Metadata models 212 includes objects that store base metadata, human resources metadata, and the customer metadata including classes, methods, and relationships.

Persistence 214 is used to store system objects including data in metadata models and the definitions of metadata models themselves. Objects are stored in tables including an instance table, an attribute table, and a reference table. The tables are designed to store data that has been specified; empty values are not stored in the tables. The data is encrypted and only accessible by object management server 200. In some embodiments, the tables storing the system objects are all loaded into memory of the system when the system is executing.

Conceptually the use of the three tables enables not having a functional domain specific schema in the relational database that can change often, but instead only have a minimalistic metamodel for persistence (e.g., the instance, attribute, and reference tables) that hopefully never change. Changing a minimalistic metamodel to reflect a change to a business object is very easy and doable with a lot of control.

Therefore, this approach has tremendous flexibility over having to keep a relational schema in sync with the metadata definitions of functional objects. Also, not having to keep the relational schema in sync eliminates a step for the changes (i.e., step 1—change metadata, step 2—change relational schema) and is in line with no-compile execution of a human resource system. In various embodiments, if appropriate for a minimalistic metamodel for persistence, a different number of tables—for example, four or five or two is used—is used.

Interpretive engine 216 is used to execute the human resource system by interpretively processing metadata models 212 and processes. Processes include processes associated with definition service 206, secure transaction processing 208, data access and set access methods 210, and persistence 214. Interactive engine 216 when processing the defined metadata models (e.g., metadata models 212) and defined processes is sufficient to be a fully functional human resource system. The fully functional human resource system is capable of providing the functionality required by a user and/or requestor. Functionality of a human resource system include one or more of the following functions: tracking employee histories, data, skills, experiences, positions, salaries, managers, attendance, vacation time, sick leave time, payroll deductions, health benefits, stock or stock option benefits, insurance benefits, pension benefits, profit sharing benefits, etc., issuing payroll checks or instructions, processing travel reimbursement, benefit enrollment, tracking training or professional development, or any other appropriate functionality for human resource management.

Figure 3:
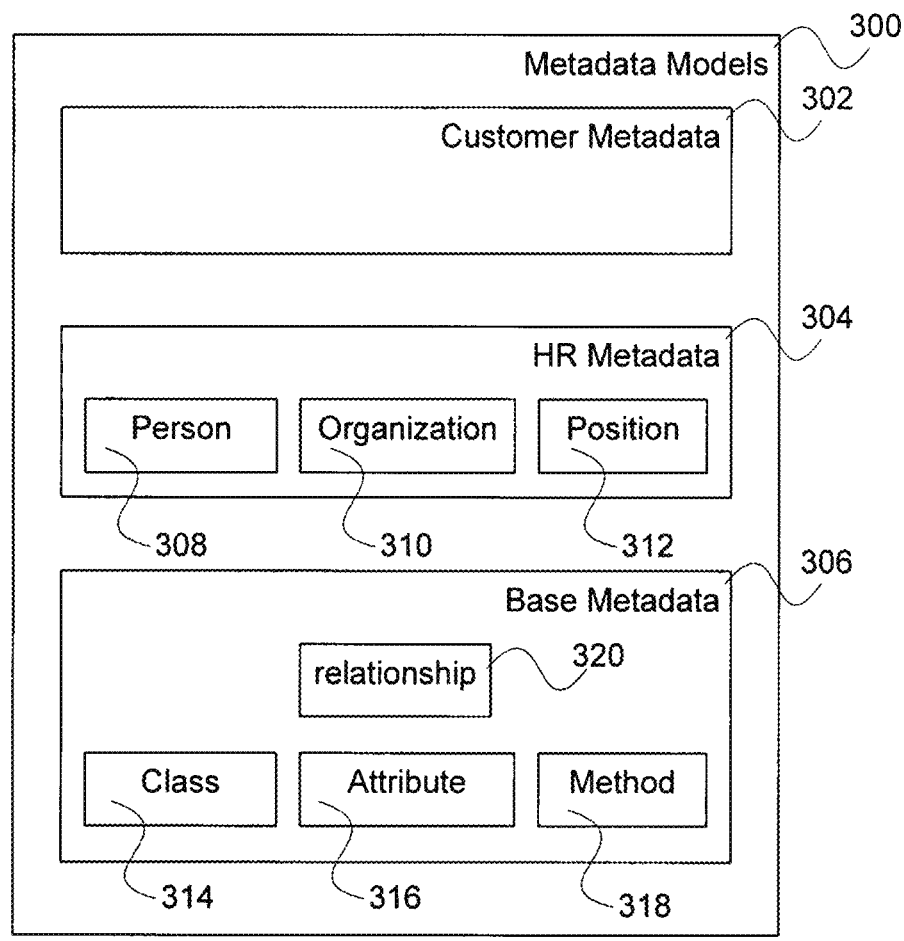
FIG. 3 is a block diagram illustrating an embodiment of metadata models.

FIG. 3 is a block diagram illustrating an embodiment of metadata models. In some embodiments, metadata models of FIG. 3 are used to implement metadata models 212 of FIG. 2. In the example shown, metadata models 300 includes customer metadata 302, human resources (HR) metadata 304, and base metadata 306. Base metadata 306 includes basic objects for the system including class 314, attribute 316, relationship 320 and method 318. HR metadata 304 includes objects which can be based on base metadata 306 objects. HR metadata 304 includes objects person 308, organization 310, and position 312. Customer metadata 302 objects include customized object for a given customer. Customer metadata 302 objects can be based on HR metadata 304 objects and/or base metadata 306 objects.

Figure 4A:
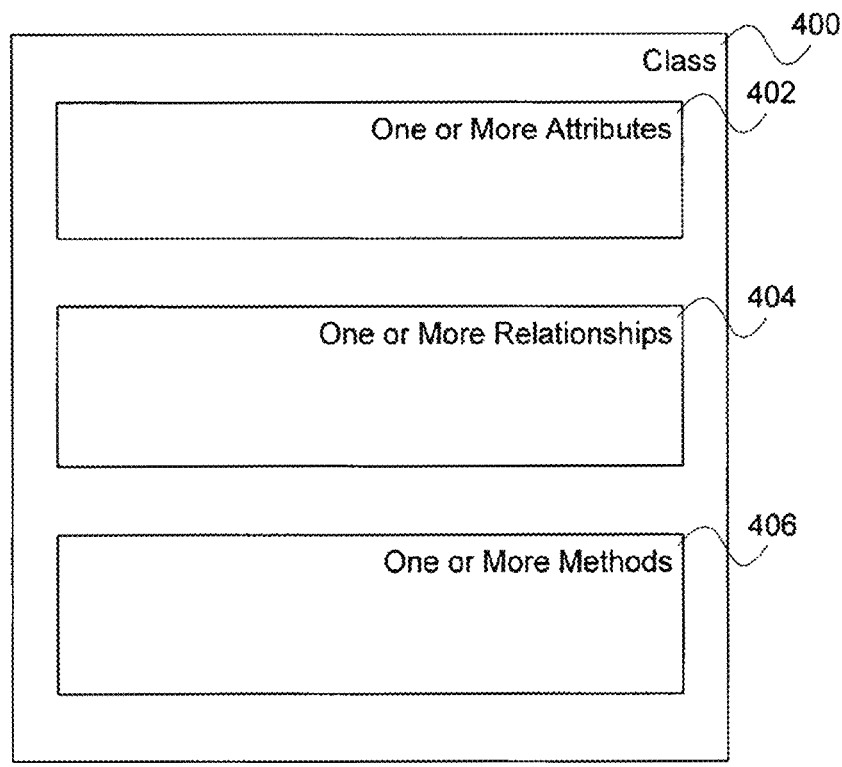
FIG. 4A is a block diagram illustrating an embodiment of an object class.

FIG. 4A is a block diagram illustrating an embodiment of an object class. In some embodiments, class 400 of FIG. 4A is used to implement object class 314 of FIG. 3. In the example shown, class 400 includes one or more attributes 402, one or more relationships 404, and one or more methods 406. One or more attributes 402 includes one or more attributes that are associated with class 400. One or more relationships 404 includes one or more relationships between class 400 and other classes 400. These relationships are bi-directional and the system automatically creates a corresponding sibling relationship for each relationship specified between two classes. This allows for rich cross object navigation in the applications. And one or more methods 406 includes one or more methods for performing an action. Class 400 expresses structural and behavioral design decisions indicating what types of objects can exist when the program is executed. Attributes 402 comprise values that can be associated with an object. For example, an object COMPANY has an attribute STATE OF INCORPORATION, which can have a value such as DELAWARE. Attributes 402 can be one of the following subclasses of attribute: Text, Date, Boolean, Numeric, XML String, File, or Currency. Relationships 404 are a type of association with another object. Examples of relationships include HAS, FOR, USES, USED BY or INHERITS FROM. For example, object COMPANY has a relationship HAS with object PARENT COMPANY. Examples of methods 406 include accessing attribute data, assigning attribute data, getting referenced attribute/element/instance set, getting attribute/element/instance set from a parameter set, evaluating a Boolean expression, evaluating a condition, comparing attributes, comparing elements, comparing instance sets, building an attribute, building a method, calculating a numeric quantity, calculating a date, controlling a transaction, processing updates, processing related updates, spawning internal messages, invoking a web service, building a user interface response, building a web service response, defining a flow, setting a flow state, execute a system routine, etc.

Figure 4B:
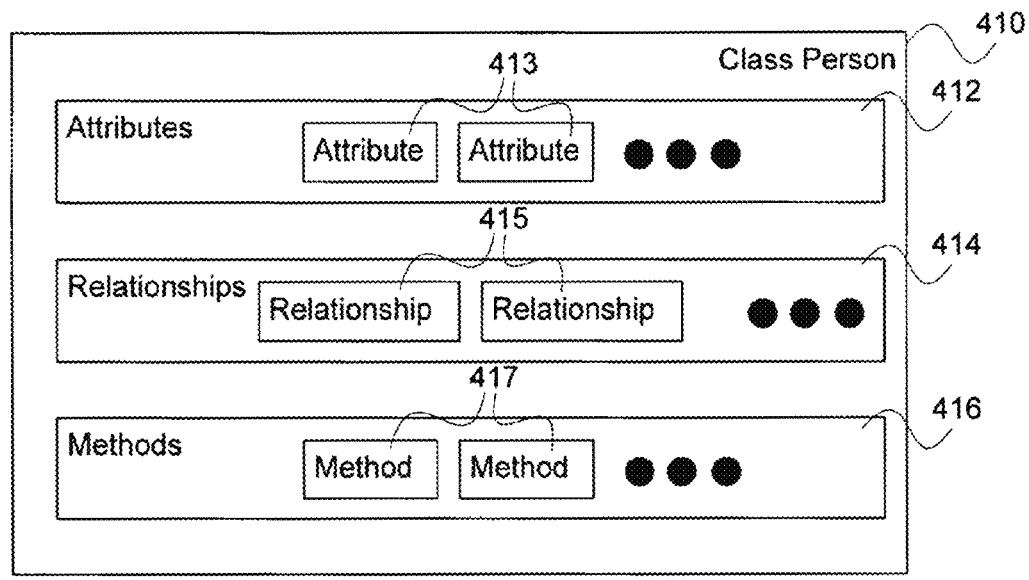
FIG. 4B is a block diagram illustrating an embodiment of an object class person.

FIG. 4B is a block diagram illustrating an embodiment of an object class person. In some embodiments, object class person 410 is used to implement person 308 of FIG. 3. In the example shown, object class person 410 includes attributes 412, relationships 414, and methods 416. Attributes 412 includes a plurality of attributes represented in FIG. 4B by 413. Examples of attributes associated with object class person 410 include description field-ethnicity descriptor, gender descriptor, hair color descriptor, amount field-compensation element amount, employee count, total base pay for employees, date-date of birth, company seniority hire date, Area Code, Name, Description, and/or Email Address. Relationships 414 includes a plurality of relationships represented in FIG. 4B by 415. Examples of relationships associated with object class person 410 are Person HAS Demographic Descriptor, Person HAS Biographic Descriptor, Person SENT Notification, etc. Methods 416 include a plurality of methods represented in FIG. 4B by 417. Examples of methods associated with object class person 410 are Get Age on Date, Get Beneficiary, Get Citizenship Status, Get Address Data, Process Employee Data, etc.

Figure 5:
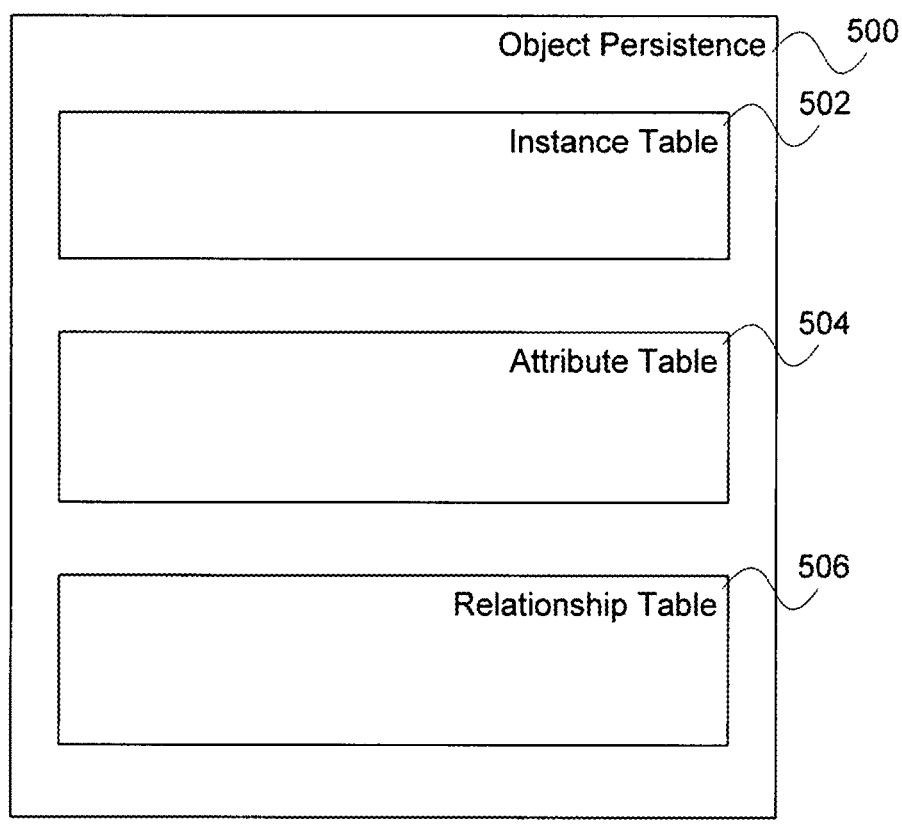
FIG. 5 is a block diagram illustrating an embodiment of tables for object persistence.

FIG. 5 is a block diagram illustrating an embodiment of tables for object persistence. In some embodiments, object persistence 500 is used to implement tables associated with persistence 214 of FIG. 2. In the example shown, object persistence 500 includes instance table 502, attribute table 504, and reference table 506. Instance table 502 is used to store instances of objects of the HR system including metadata models. Attribute table 504 is used to store data stored in attributes as defined in metadata models. Reference table 506 is used to store data stored in relationships as defined in metadata models.

Figure 6:
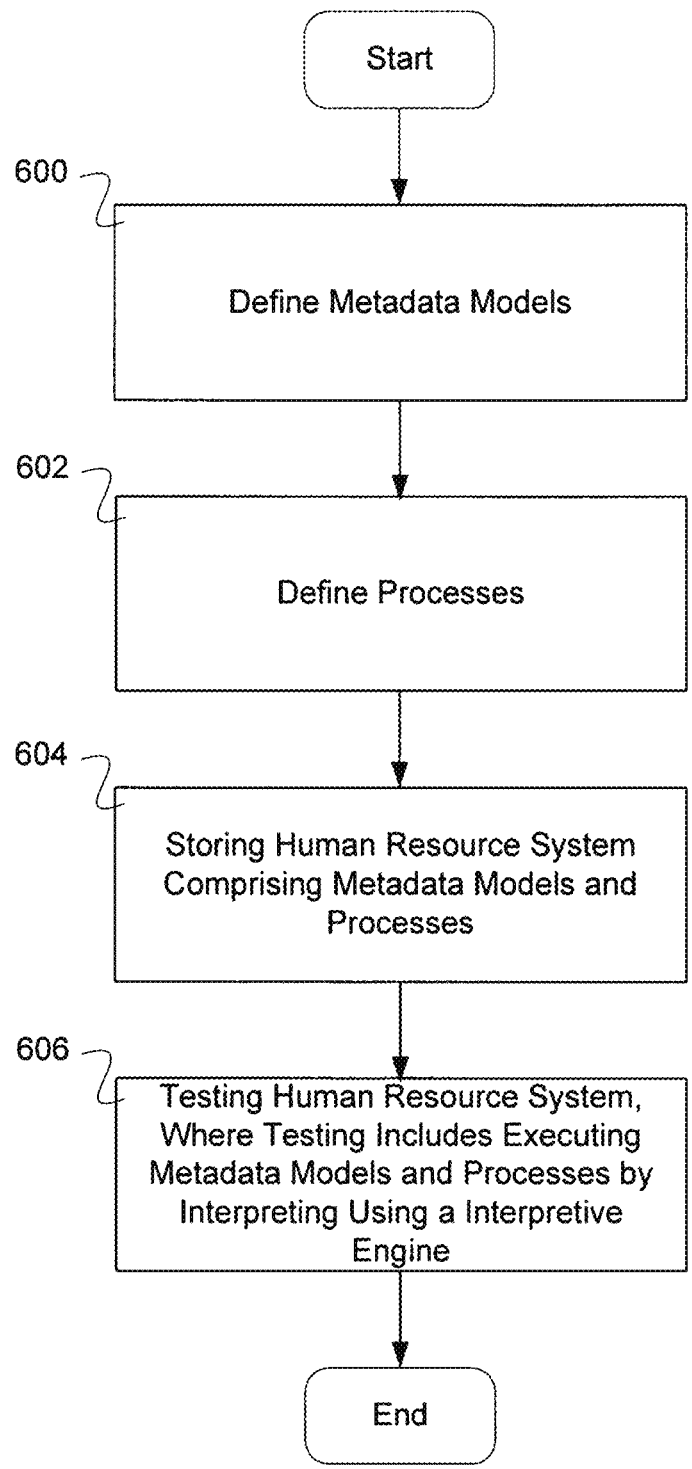
FIG. 6 is a flow diagram illustrating an embodiment of a process for developing a human resources system.

FIG. 6 is a flow diagram illustrating an embodiment of a process for developing a human resources system. In some embodiments, the process of FIG. 6 is executed on the hardware system as shown in FIG. 1 and using the software system as shown in FIG. 2. In the example shown, in 600 metadata models are defined. In 602, processes are defined. In 604, the human resources system is stored where the human resources system comprises the metadata models and the processes. In 606, the human resources system is tested, where testing includes executing the metadata models and the processes interpreting using an interpretive engine. For testing, there is no need to deploy the system into a runtime environment from a development environment. In various embodiments, the interpretive engine comprises a java interpretive engine or a .NET platform. The metadata models and processes are loaded into memory when the human resources system is executing.

Figure 7:
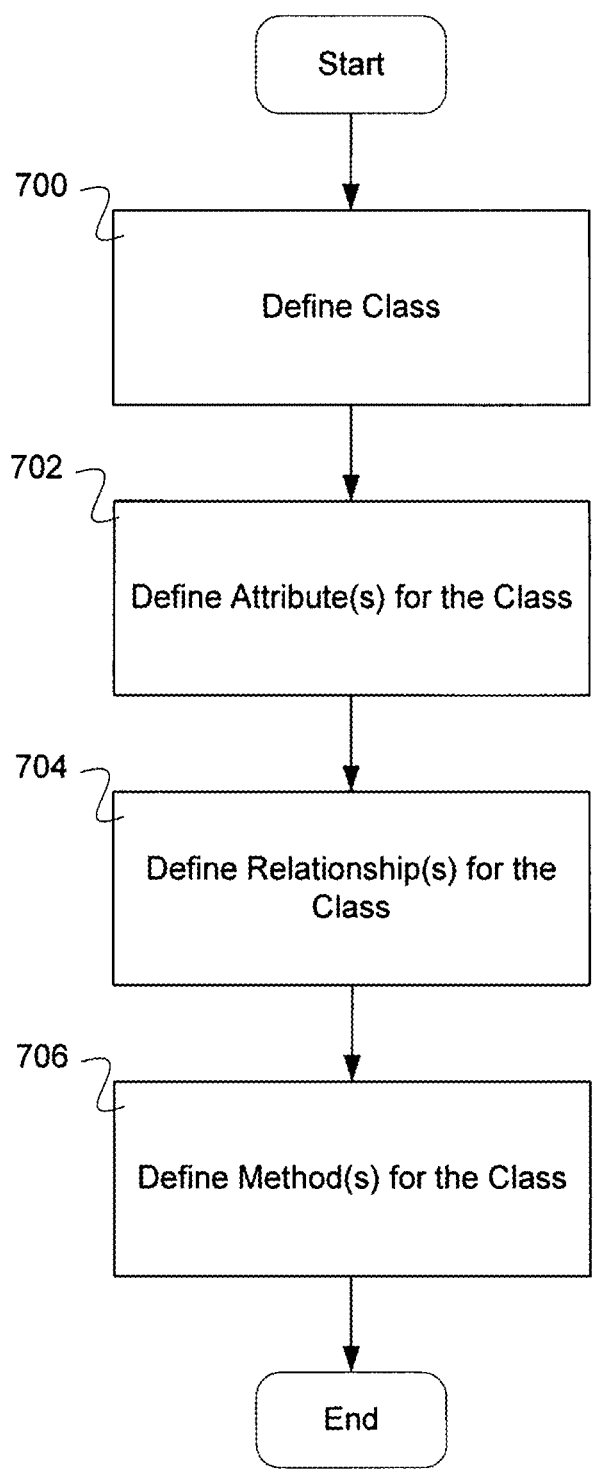
FIG. 7 is a flow diagram illustrating an embodiment of a process for defining metadata models.

FIG. 7 is a flow diagram illustrating an embodiment of a process for defining metadata models. In some embodiments, the process of FIG. 7 is used to implement 600 of FIG. 6. In the example shown, in 700 a class is defined. In 702, one or more attributes of the class is/are defined. In 704, one or more relationships of the class is/are defined. In 706, one or more methods of the class is/are defined.

In some embodiments, a class comprises a Person, a dependent, beneficiaries, emergency contacts, Worker, Employee, Contingent Worker, Position, Position Group, Organization, Business Site, Compensation Package, Benefits Package, Stock package, Applicant, Performance Evaluation, Leave, Payroll data, and Paid time off.

Figure 8:
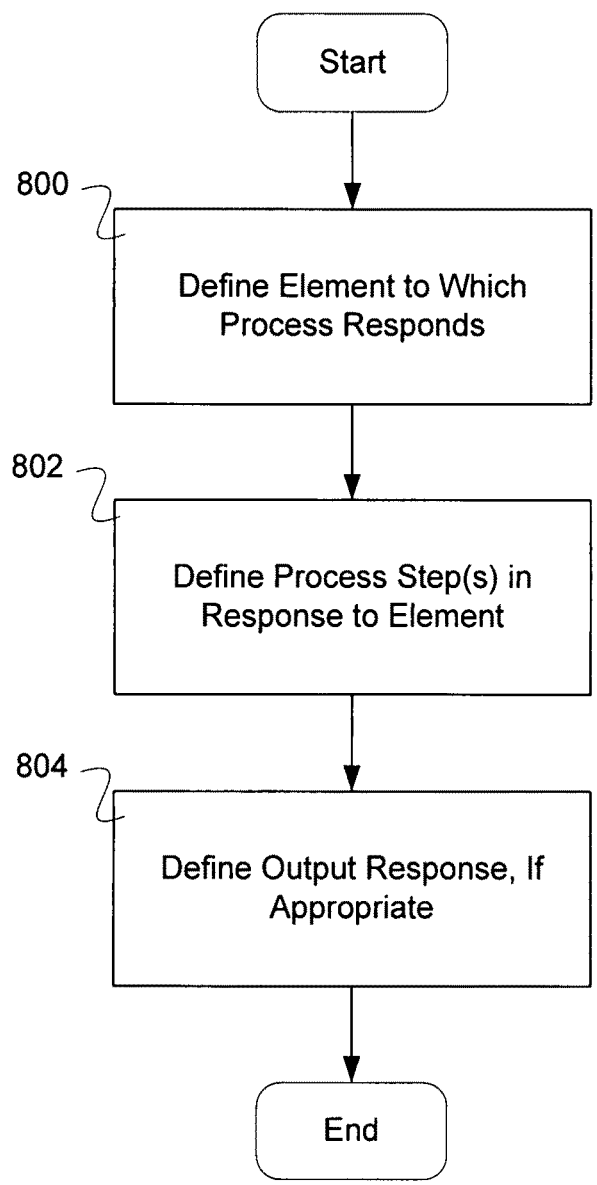
FIG. 8 is a flow diagram illustrating an embodiment of a process for defining processes.

FIG. 8 is a flow diagram illustrating an embodiment of a process for defining processes. In some embodiments, the process of FIG. 8 is used to implement 602 of FIG. 6. In the example shown, in 800 the element to which the process responds is defined. The element is an input condition which triggers the process. In 802, process step(s) in response to the element are defined. In 804, one or more output responses are defined, if appropriate.

Figure 9:
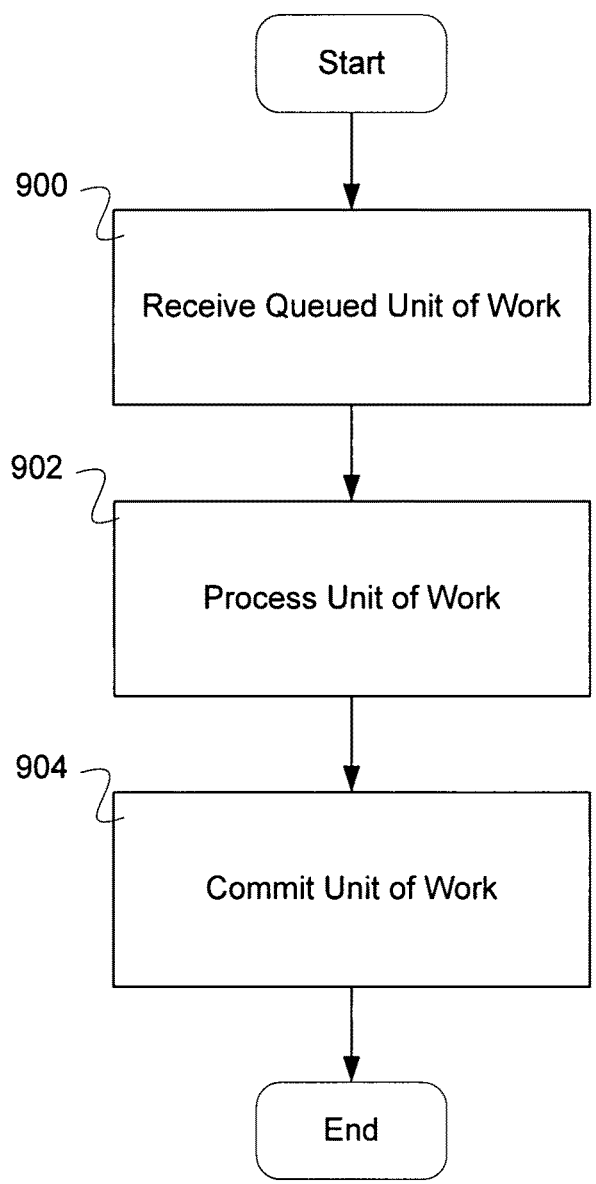
FIG. 9 is a flow diagram illustrating an embodiment of a transaction process.

FIG. 9 is a flow diagram illustrating an embodiment of a transaction process. In some embodiments, the process of FIG. 9 is used to implement secure transactional processing 208 of FIG. 2. In the example shown, a unit of work is received from a queue. In some embodiments, the unit of work is a transaction that has been requested via the world wide web using a request based on XML. The transaction request is queued until the system is ready to process the transaction. At this point, the unit of work is de-queued. In various embodiments, only one transaction is processed at a time or a number of transactions are processed in parallel. In 902, the unit of work is processed. In 904, the unit of work is committed. In some embodiments, a user does not see a response until after the unit of work is committed.

Figure 10:
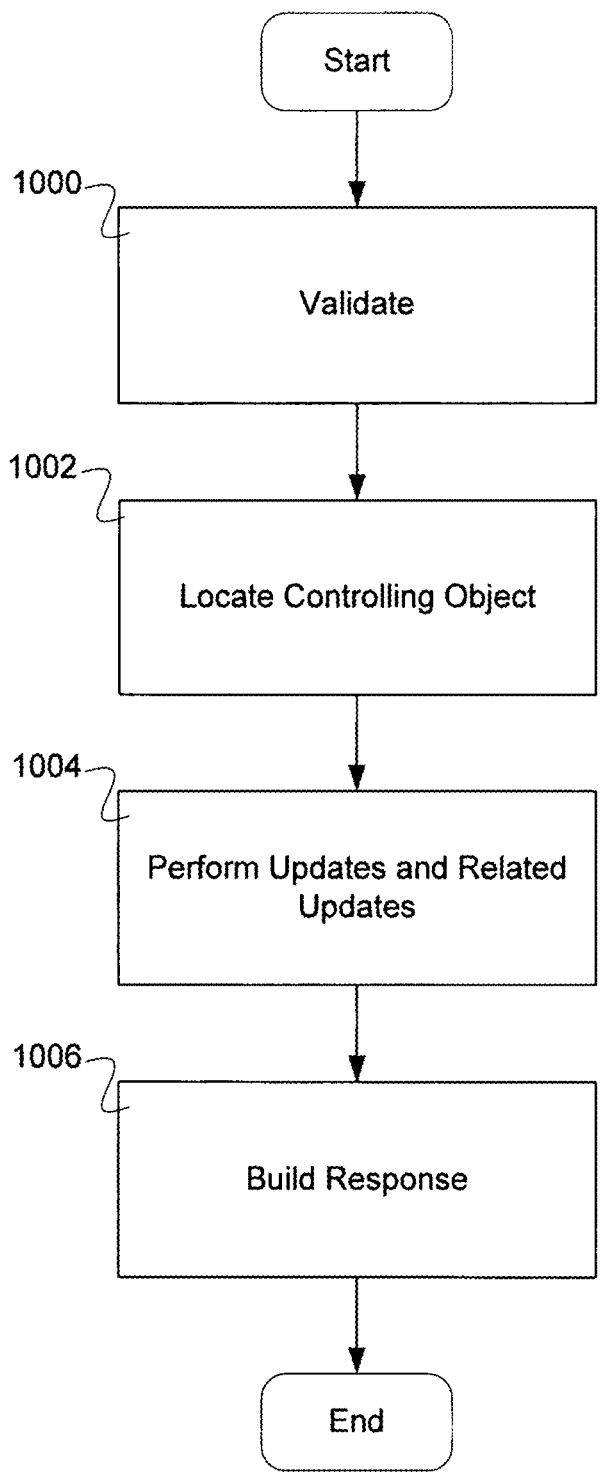
FIG. 10 is a flow diagram illustrating an embodiment of unit of work processing.

FIG. 10 is a flow diagram illustrating an embodiment of unit of work processing. In some embodiments, the process of FIG. 10 is used to implement 902 of FIG. 9. In the example shown, in 1000 validation occurs. Validation includes validating the legitimacy of the input request (e.g., security, schema, and data). In validating security, a user's roles are matched against the request to make sure that the request can be initiated by the user. In schema validation, definitions are checked to ensure that the appropriate attributes are available or have been included with a user's request—for example, a check is performed to see that the XML schema is appropriate in an XML based request and that the request corresponds to the metadata definition of the request element. In validating data, range and type of data are checked. In 1002, one or more controlling objects are located or created. The controlling object is the object that is designated to handle a request of the type submitted for processing. In 1004, updates and related updates are performed. The controlling object updates necessary attributes/relationships and related objects are asked to update necessary attributes/relationships. In some embodiments, the related objects are organized in a tree structure with the controlling object as the trunk of the tree; so, each of the branches of the tree and its objects perform their updates in turn until the entire tree has performed its updates—the tree is walked to process all of the updates and related updates. In some embodiments, other requests are spawned during the processing handled by the controlling object and the requests are entered in the queue of requests. In 1006, a response is built. In some embodiments, the response is issued to the user after the updates and related updates are committed as part of the completion of processing. Processing to perform updates includes interpreting processes using an interpretive engine such as a java interpretive engine or any other appropriate interpretive engine.

In some embodiments, method comprises a granular step of a process. There are thousands of method calls for a business process. For example, the business process of hiring includes many transactional processes that call many methods. A process includes a sequence of many methods strung together.

In some embodiments, one or more updates to stored data and/or stored metadata models is/are committed after an entire unit of work or transaction is processed. In some embodiments, committing results in the updated stored data and/or updated stored metadata being transferred to permanent storage. In some embodiments, a response is sent to the requestor via the world wide web after the committing one or more updates to stored data and/or stored metadata models.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for defining a human resources system, comprising:
   receiving at least one new metadata model that defines at least one new object class in the human resource system, wherein the new metadata model includes one or more attributes, one or more relationships, and one or more methods associated with the new object class;
   receiving process definitions;
   storing, in a storage module, the new metadata model including data associated with the new metadata model, and the process definitions in a minimalistic metamodel for persistence, wherein the minimalistic metamodel for persistence comprises three tables comprising an instance table, an attribute table, and a reference table for all of the objects in the human resources system, wherein the new metadata model including data associated with the new metadata model is stored by storing one or more instances of the new object class in the instance table, the one or more attributes in the attribute table, and the one or more relationships in the reference table, wherein:
      the instance table stores all instances of object classes in the human resource system as defined by a plurality of metadata models;
      the attribute table stores attribute data associated with all the instances of the object classes as defined by the plurality of metadata models;
      the reference table stores relationship data associated with all the instances of the object classes as defined by the plurality of metadata models;
      the instance table, the attribute table, and the reference table store data that has been specified;
      metadata model definitions and the process definitions are able to be interpreted using an interpretive engine; and
      the interpretive engine is configured to process the metadata model definitions and process definitions without compilation of any code; and
      at a time of execution by the interpretive engine, all the objects specified in the instance table, the attribute table, and the reference table and processes are loaded into memory for easy modification of instances of objects defined by the plurality of metadata models and the new metadata model;
for a process of one or more processes defined by the process definitions:
  defining an element to which the process responds;
  defining one or more process steps in response to the element; and
  defining an output response, wherein the process when interpreted by the interpretive engine are sufficient to define a fully functional human resource system;
receiving an update, wherein the update includes a change to an existing instance of an object class in the human resource system;
updating the human resource system by adding, removing, or changing a plurality of entries associated with the existing instance of the object class in at least one of the instance table, the attribute table, and the reference table, comprising:
  validating a transaction request relating to the existing instance of the object class, comprising:
    ensuring a requestor has privileges to perform a requested transaction;
    checking whether the transaction request corresponds to a metadata definition of an element of the transaction request; and
    ensuring that data in the requested transaction is of a correct type and in a correct range of values;
  determining whether a controlling object to be updated exists, wherein the instances of the object class are organized in a tree structure the controlling object relating to a trunk of the tree structure;
  in the event that the controlling object to be updated does not exist creating the controlling object; and
  in the event that the controlling object to be updated exists, locating the controlling object associated with an instance of the object class;
  transferring the plurality of entries associated with the existing instance of the object class in the at least one of the instance table, the attribute table, and the reference table to the storage module after the updating of the human resource system is performed, wherein the transferring of the plurality of entries to the storage module is performed after each of the adding, removing, or changing to the plurality of entries have been completed to avoid inconsistencies in the human resource system, the storage module including permanent storage; and
  executing the updated human resources system by interpreting the stored metadata model definitions and process definitions using the interpretive engine.

2. A computer program product for defining a human resources system, the computer program product being embodied in a non-transitory computer readable medium and comprising computer instructions for:
  receiving at least one new metadata model that defines at least one new object class in the human resource system, wherein the new metadata model includes one or more attributes, one or more relationships, and one or more methods associated with the new object class;
  receiving process definitions;
  storing, in a storage module, the new metadata model including data associated with the new metadata model, and the process definitions in a minimalistic metamodel for persistence, wherein the minimalistic metamodel for persistence comprises three tables comprising an instance table, an attribute table, and a reference table for all of the objects in the human resources system, wherein the new metadata model including data associated with the new metadata model is stored by storing one or more instances of the new object class in the instance table, the one or more attributes in the attribute table, and the one or more relationships in the reference table, wherein:
    the instance table stores all instances of object classes in the human resource system as defined by a plurality of metadata models;
    the attribute table stores attribute data associated with all the instances of the object classes as defined by the plurality of metadata models;
    the reference table stores relationship data associated with all the instances of the object classes as defined by the plurality of metadata models;
    the instance table, the attribute table, and the reference table store data that has been specified;
    metadata model definitions and the process definitions are able to be interpreted using an interpretive engine; and
    the interpretive engine is configured to process the metadata model definitions and process definitions without compilation of any code;
    at a time of execution by the interpretive engine, all the objects specified in the instance table, the attribute table, and the reference table and processes are loaded into memory for easy modification of instances of objects defined by the plurality of metadata models and the new metadata model; and
  for a process of one or more processes defined by the process definitions:
    defining an element to which the process responds;
    defining one or more process steps in response to the element; and
    defining an output response, wherein the process when interpreted by the interpretive engine are sufficient to define a fully functional human resource system;
  receiving an update, wherein the update includes a change to an existing instance of an object class in the human resource system;
  updating the human resource system by adding, removing, or changing a plurality of entries associated with the existing instance of the object class in at least one of the instance table, the attribute table, and the reference table, comprising:
    validating a transaction request relating to the existing instance of the object class, comprising:
      ensuring a requestor has privileges to perform a requested transaction;
      checking whether the transaction request corresponds to a metadata definition of an element of the transaction request; and
      ensuring that data in the requested transaction is of a correct type and in a correct range of values;
    determining whether a controlling object to be updated exists, wherein the instances of the object class are organized in a tree structure, the controlling object relating to a trunk of the tree structure;
    in the event that the controlling object to be updated does not exist creating the controlling object; and
    in the event that the controlling object to be updated exists, locating the controlling object associated with an instance of the object class;
  transferring the plurality of entries associated with the existing instance of the object class in the at least one of the instance table, the attribute table, and the reference table to the storage module after the updating of the human resource system is performed, wherein the transferring of the plurality of entries to the storage module is performed after each of the adding, removing, or changing to the plurality of entries have been completed to avoid inconsistencies in the human resource system, the storage module including permanent storage; and executing the updated human resources system by interpreting the stored metadata model definitions and process definitions using the interpretive engine.

3. A system for defining a human resources system, comprising:

a processor;

a storage module for storing data associated with the human resources system; and a memory coupled with the processor, wherein the memory is configured to provide the processor with instructions which when executed cause the processor to:

receive at least one new metadata model that defines at least one new object class in the human resource system, wherein the new metadata model includes one or more attributes, one or more relationships, and one or more methods associated with the new object class;

receive process definitions;

store the new metadata model including data associated with the new metadata model, and the process definitions in a minimalistic metamodel for persistence, wherein the minimalistic metamodel for persistence comprises three tables comprising an instance table, an attribute table, and a reference table for all of the objects in the human resources system, wherein the new metadata model including data associated with the new metadata model is stored by storing one or more instances of the new object class in the instance table, the one or more attributes in the attribute table, and the one or more relationships in the reference table, wherein:

the instance table stores all instances of object classes in the human resource system as defined by a plurality of metadata models;

the attribute table stores attribute data associated with all the instances of the object classes as defined by the plurality of metadata models;

the reference table stores relationship data associated with all the instances of the object classes as defined by the plurality of metadata models;

the instance table, the attribute table, and the reference table store data that has been specified;

metadata model definitions and the process definitions are able to be interpreted using an interpretive engine; and the interpretive engine is configured to process the metadata model definitions and process definitions without compilation of any code;

at a time of execution by the interpretive engine, all the objects specified in the instance table, the attribute table, and the reference table and processes are loaded into the memory for easy modification of instances of objects defined by the plurality of metadata models and the new metadata model; and for a process of one or more processes defined by the process definitions:

defining an element to which the process responds;

defining one or more process steps in response to the element; and defining an output response, wherein the process when interpreted by the interpretive engine are sufficient to define a fully functional human resource system;

receive an update, wherein the update includes a change to an existing instance of an object class in the human resource system;

update the human resource system by adding, removing, or changing a plurality of entries associated with the existing instance of the object class in at least one of the instance table, the attribute table, and the reference table, comprising:

validate a transaction request relating to the existing instance of the object class, comprising:

ensure a requestor has privileges to perform a requested transaction;

check whether the transaction request corresponds to a metadata definition of an element of the transaction request; and ensure that data in the requested transaction is of a correct type and in a correct range of values;

determine whether a controlling object to be updated exists, wherein the instances of the object class are organized in a tree structure, the controlling object relating to a trunk of the tree structure;

in the event that the controlling object to be updated does not exist create the controlling object; and in the event that the controlling object to be updated exists, locate the controlling object associated with an instance of the object class;

transfer the plurality of entries associated with the existing instance of the object class in the at least one of the instance table, the attribute table, and the reference table to the storage module after the updating of the human resource system is performed, wherein the transferring of the plurality of entries to the storage module is performed after each of the adding, removing, or changing to the plurality of entries have been completed to avoid inconsistencies in the human resource system the storage module including permanent storage; and execute the updated human resources system by interpreting the stored metadata model definitions and process definitions using the interpretive engine.

4. A system as in claim 3, wherein the new object classes comprises: Person, dependence, beneficiaries, emergency contacts, Worker, Employee, Contingent Worker, Position, Position Group, Organization, Business Site, Compensation Package, Benefits Package, Stock package, Applicant, Performance Evaluation, Leave, Payroll data, or Paid time off.

5. A system as in claim 3, wherein the one or more attributes include at least one of the following: description field-ethnicity descriptor, gender descriptor, hair color descriptor, amount field-compensation element amount, employee count, total base pay for employees, date-date of birth, company seniority hire date, Area Code, Name, Description, and/or Email Address.

6. A system as in claim 3, wherein at least one of the one or more attributes includes subclasses.

7. A system as in claim 6, wherein attribute subclasses include one or more of the following: Text, Date, Boolean, Numeric, XML String, File, or Currency.

8. A system as in claim 3, wherein the one or more methods include at least one of the following: accessing an attribute data, assigning an attribute data, getting a referenced attribute, getting a referenced element, getting a referenced instance set, getting an attribute from a parameter set, getting an element from a parameter set, getting an instance set from a parameter set, evaluating a Boolean expression, evaluating a condition, comparing two or more attributes, comparing two or more elements, comparing two or more instance sets, building an attribute, building a method, calculating a numeric quantity, calculating a date, controlling a transaction, processing one or more updates, processing one or more related updates, spawning one or more internal messages, invoking a web service, building a user interface response, building a web service response, defining a flow, setting a flow state, or execute a system routine.

9. A system as in claim 3, wherein the one or more relationships include at least one of the following: FOR, IS, USES, USED BY, INHERITS FROM, RETURNS, or HAS.

10. A system as in claim 3, wherein processes include one or more elements to respond to.

11. A system as in claim 3, wherein processes include one or more internal steps to execute after element arrives.

12. A system as in claim 3, wherein processes include one or more internal steps to execute after element arrives from a user client.

13. A system as in claim 3, wherein processes include one or more internal steps to execute after element arrives from a web service client.

14. A system as in claim 3, wherein processes include one or more process outputs.

15. A system as in claim 3, wherein the interpretive engine comprises an interpretive java engine.

16. A system as in claim 3, wherein the interpretive engine comprises a .NET platform.

17. A system as in claim 3, wherein the fully functional human resource system includes one or more of the following: capability for tracking employee histories, data, skills, experiences, positions, salaries, managers, attendance, vacation time, sick leave time, payroll deductions, health benefits, stock or stock option benefits, insurance benefits, pension benefits, profit sharing benefits, issuing payroll, processing travel reimbursement, or tracking training or professional development.

* * * * *